Oct. 31, 1950     I. L. ELDER     2,528,470
SPEED REDUCER
Filed April 13, 1946
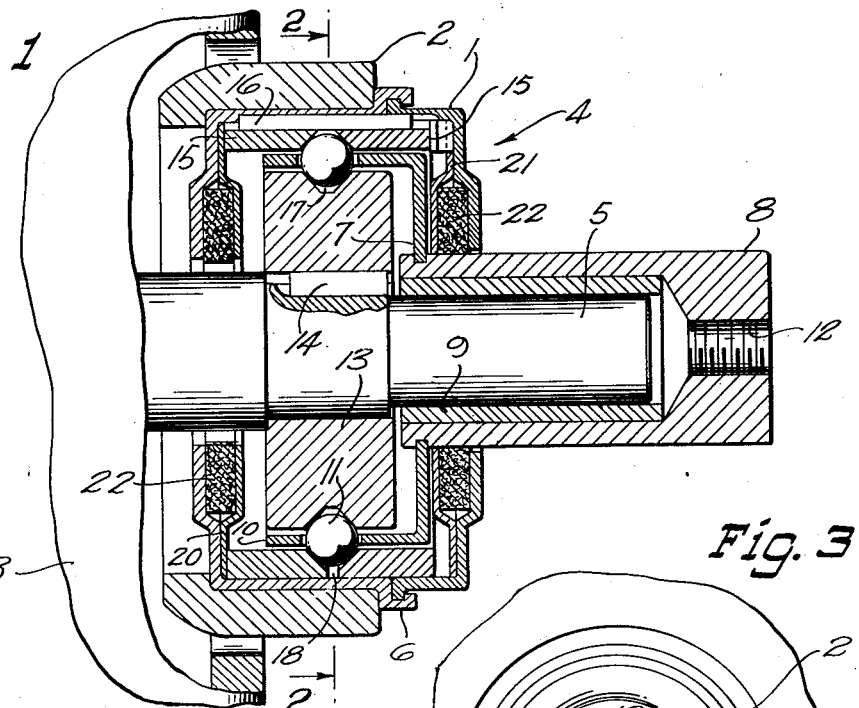
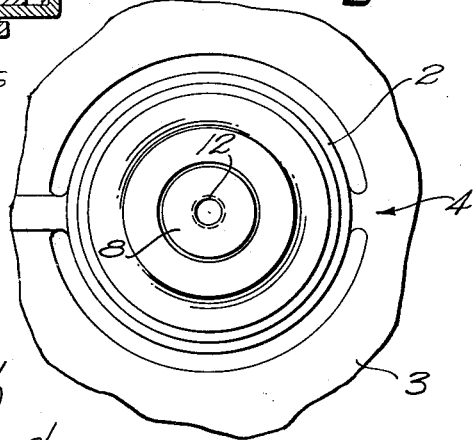
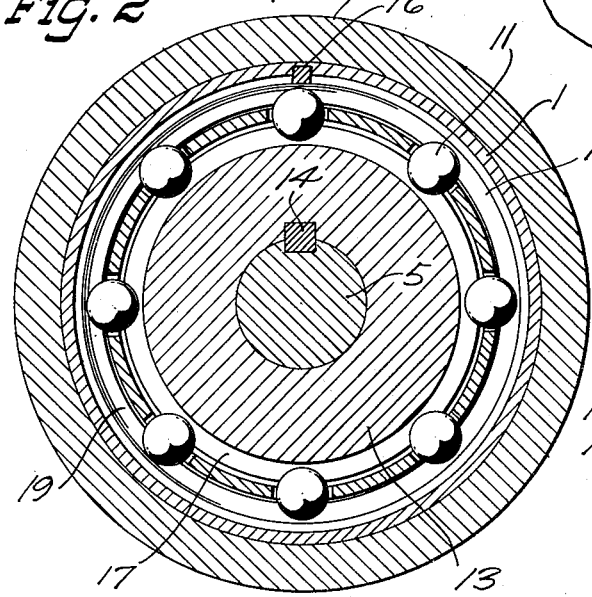
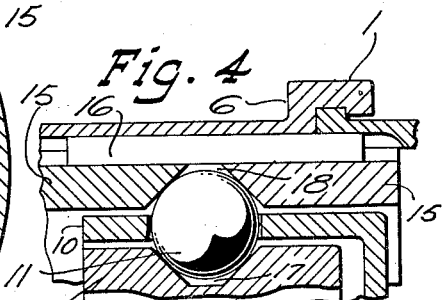
Inventor
Irvin L. Elder
By
Attorney Patented Oct. 31, 1950

2,528,470

UNITED STATES PATENT OFFICE 2,528,470

SPEED REDUCER

Irvin L. Elder, Milwaukee, Wis., assignor to A. O. Smith Corporation, Milwaukee, Wis., a corporation of New York Application April 13, 1946, Serial No. 661,932

5 Claims. (Cl. 74—798)

1

This invention relates to a speed reducer and has particular relation to a ball bearing type of reducer with a pressure receiving and non-rotating outer race for employment with an electric motor for driving fans, blowers and the like.

The present invention is directed to a construction in which a speed reducer is assembled in the end bell of a standard electric motor and utilized both for motor shaft bearing and to reduce the R. P. M. of the motor shaft in driving a fan, blower or the like therefrom.

The principal object of the invention is to provide a speed reducer to be assembled with an electric motor in which the pressure for maintaining the driving and driven elements in operative engagement without slipping is applied to the non-rotating race.

Another object of the invention is to provide an inexpensive speed reducer that is compact and quiet in operation.

A further object is to provide a speed reducer in which bearing troubles and wear on the races is substantially reduced.

These and other objects of the invention will appear hereinafter in connection with the following description of an embodiment of the invention illustrated in the accompanying drawing in which:

Figure 1 is a longitudinal sectional view of the speed reducer assembly with a portion of a motor shown in elevation;

Fig. 2 is a section taken on line 2—2 of Figure 1 through the ball bearings;

Fig. 3 is an end view of the assembly; and

Fig. 4 is a fragmentary section showing the outer race keyed to the shell.

The speed reducer of the invention employed to reduce the R. P. M. of a driving motor in transmitting the motor R. P. M. to a fan or the like, in general comprises a housing I which is press fitted within the end bell 2 of the motor 3 and houses the reducer assembly 4 assembled around the projecting end of the motor shaft 5.

The housing I is preferably formed of two parts that are joined together such as by a welded or locked seam at the circumferential joint 6.

The reducer assembly 4 has a cage 7, the outer end portion 8 of which is assembled around the bushing 9 disposed on shaft 5, and the inner end 10 of which is enlarged and provided with radially spaced retainer apertures to receive the ball bearings II and axially confine the same. The extreme outer end of cage 7 has the threaded longitudinal hole 12 therein for attachment of a fan or the like.

2

The ball bearings II are radially confined between the inner rotating race 13 which is keyed at 14 to shaft 5 and, the outer non-rotating race 15 which is keyed at 16 to housing I or otherwise secured thereto against rotation.

The inner race 13 has substantial thickness and is provided with the circumferential groove 17 in the outer periphery to receive the balls II.

The cylindrical outer race 15 is split circumferentially in half at 18 and the opposed edges of the separate halves are circumferentially chamfered at 19 complementary to groove 17 of the inner race 13 to receive and confine balls II between the races. Each half of race 15 is keyed at 16 to the housing I as previously described to prevent rotation but permitting axial movement thereof.

The outer race 15 is axially confined within the cup washer 20 disposed within the inner end of housing I and the spring washer 21 which is located within the outer end of housing I. Cup washer 20 provides an axial bearing for outer race 15 and also retains lubricant.

The spring washer 21 places the halves of race 15 under compression and produces the necessary force between races 13 and 15 and balls II to withstand the torque required to rotate cage 7 from motor shaft 5 at a substantially reduced R. P. M.

A felt washer 22 is confined between housing I and cup washer 20, and housing I and spring washer 21 to retain lubricant along with cup washer 20.

In fabricating the reducer the cage 7 is preferably made of two parts, with the outer end portion 8 that is to be disposed around shaft 5 for rotation on bushing 9 being of suitable bearing material. The inner end portion 7 of the cage proper is of lighter weight metal and is deep drawn to the proper dimensions with the retainer holes for balls II punched in proper radially spaced positions. The two portions of the cage are then secured together by any suitable means.

The outer felt washer 22 is first placed in the outer part of housing I and spring washer 21 and the outer half of race 15 are inserted in the housing with the race half keyed thereto at 16 against rotation.

Cage 7, balls II and inner race 13 are located in the outer part of the housing by insertion through the inner end thereof together with bushing 9.

Inner felt washer 22, cup washer 20 and the inner half of outer race 15 are inserted within the inner part of housing I in the order named. The inner half of race 15 is keyed to the housing at 16 upon insertion to prevent rotation thereof.

Thereafter the two parts of housing 1 are joined together by crimping the outer end of the inner part of the housing over the inner end of the outer part thereof to lock them together at circumferential joint 6.

The reducer is then assembled with a motor by reboring the end bell and remachining shaft 5 to provide key 14. The reducer is thereafter press-fitted into the bore of end bell 2 and the inner race is keyed to shaft 5 at 14 for rotation therewith.

In operation, as shaft 5 rotates, inner race 13 is rotated thereby and transmits rotary motion to cage 7 through balls 11 and split outer race 15. The halves of race 15 are secured to housing 1 against rotation as described but float axially against balls 11 under compression from spring 21 to produce the necessary friction between the inner and outer races and balls to transmit torque from motor shaft 5 sufficient to rotate the cage or driven member 7 at a substantially reduced R. P. M. The pressure for transmitting the motor torque is thus applied to the non-rotating outer race 15 which eliminates bearing troubles between the races and the pressure-exerting means. In addition by splitting the outer race to permit the parts to float axially apart, wear on the races is substantially eliminated.

The invention provides a compact speed reducer that can be assembled with any standard motor. The application of the pressure on the non-rotating outer split race to obtain the friction necessary to transmit the torque of the motor to the driven cage member provides for a simple pressure assembly such as the spring 21 and insures that there will be substantially no wear between the pressure member and the races.

Various embodiments of the invention may be employed within the scope of the accompanying claims.

I claim:

1. In an electric motor having a fixed housing with an open end and a rotary shaft therein, a combination bearing and speed reducer which serves as the sole support for one end of said shaft in the opening in said housing and to provide a reduction in speed for a rotary drive transmission member mounted upon the outer end of said shaft, comprising an inner ball race secured to said motor shaft to rotate therewith, an outer ball race secured against rotation in said housing, said ball races having a pair of complementary circumferential tapered raceways constituting bearing surfaces, a series of circumferentially spaced balls disposed in bearing engagement in said raceways and constituting a substantially frictionless bearing support for said shaft, a rotary drive transmission member mounted upon said shaft to rotate thereon at a relatively lower speed than said shaft, and a ball cage disposed between said inner and outer races and constituting a part of said drive transmission member to impart rotation thereto from the circumferential movement of said balls in said bearing raceway.

2. In an electric motor having a fixed housing with an open end and a rotary shaft therein, a combination bearing and speed reducer which serves as the sole support for one end of said shaft in the opening in said housing and to provide a reduction in speed for a rotary drive transmission member mounted upon the outer end of said shaft, comprising an inner ball race secured to said motor shaft to rotate therewith, an outer ball race secured against rotation in said housing, said ball races having a pair of complementary circumferential tapered raceways constituting bearing surfaces, a series of circumferentially spaced balls disposed in bearing engagement in said raceways and constituting a substantially frictionless bearing support for said shaft, a rotary drive transmission member mounted upon said shaft to rotate thereon at a relatively lower speed than said shaft, a ball cage disposed between said inner and outer races and constituting a part of said drive transmission member to impart rotation thereto from the circumferential movement of said balls in said bearing raceway, one of said inner and outer races being split circumferentially substantially central of the raceway therein to constitute two relatively axially movable parts, and spring means normally biasing said parts axially toward each other to provide a substantially constant bearing pressure upon said balls and at the same time provide for yielding of the same as a slip clutch under heavy driving loads.

3. A rotary bearing and speed reducer unit fitted into the end bell of an electric motor housing to serve as the sole support for one end of the rotor shaft of the motor for rotation, comprising a cylindrical casing secured in the end bell of the motor housing and having an inner end wall with a central opening receiving the motor shaft and a removable outer end wall with a similar central opening receiving the shaft, an inner ball race adapted to be secured to the rotor shaft for rotation therewith centrally within said casing, an outer ball race secured inside said cylindrical casing, said inner and outer ball races having complementary tapered raceways for receiving balls in bearing engagement therewith, a series of circumferentially spaced balls disposed in said raceways and between said inner and outer races to provide a substantially frictionless bearing for the rotor shaft, a rotary drive transmission member mounted upon the rotor shaft and disposed to extend through the opening in the outer wall of said casing, and a ball cage confining said balls between the inner and outer races and constituting a part of the inner end of said drive transmission member whereby circumferential movement of said balls is translated into rotation of said member and the latter is driven at a slower speed than the speed of the rotor shaft.

4. A rotary bearing and speed reducer unit fitted into the end bell of an electric motor housing to serve as the sole support for one end of the rotor shaft of the motor for rotation, comprising a cylindrical casing secured in the end bell of the motor housing and having an inner end wall with a central opening receiving the motor shaft and a removable outer end wall with a similar central opening receiving the shaft, an inner ball race adapted to be secured to the rotor shaft for rotation therewith centrally within said casing, an outer ball race secured inside said cylindrical casing, said inner and outer ball races having complementary tapered raceways for receiving balls in bearing engagement therewith, a series of circumferentially spaced balls disposed in said raceways and between said inner and outer races to provide a substantially frictionless bearing for the rotor shaft, a rotary drive transmission member mounted upon the rotor shaft and disposed to extend through the opening in the outer wall of said casing, a ball cage confining said balls between the inner and outer races and constituting a part of the inner end of said drive transmission member whereby circumferential movement of said balls is translated into rotation of said memr and the latter is driven at a slower speed an the speed of the rotor shaft, a cup washer posed inside each end wall of said casing, and oil seal confined between each cup washer and e corresponding end wall of said casing and ex- ding into engagement with rotary shaft and mber respectively, said cup washers extending twardly between the respective end of the ter race and the corresponding end wall of the sing to hold the washers in place.

5. A rotary bearing and speed reducer unit ed into the end bell of an electric motor hous- to serve as the sole support for one end of the or shaft of the motor for rotation, comprising ylindrical casing secured in the end bell of the tor housing and having an inner end wall with entral opening receiving the motor shaft and a movable outer end wall with a similar central ning receiving the shaft, an inner ball race apted to be secured to the rotor shaft for rotan therewith centrally within said casing, an er ball race secured inside said cylindrical cas-, said inner and outer ball races having commentary tapered raceways for receiving balls bearing engagement therewith, a series of cirnferentially spaced balls disposed in said raceys and between said inner and outer races to vide a substantially frictionless bearing for the or shaft, a rotary drive transmission member unted upon the rotor shaft and disposed to exd through the opening in the outer wall of d casing, a ball cage confining said balls been the inner and outer races and constituting art of the inner end of said drive transmission mber whereby circumferential movement of d balls is translated into rotation of said member and the latter is driven at a slower speed than the speed of the rotor shaft, said outer ball race being split circumferentially centrally of its raceway to be constituted of two separate relatively axially movable members bearing against the opposite sides of said balls, a cup-shaped washer disposed inside each end wall of said casing, and an oil seal confined between each washer and the corresponding end wall and adapted to extend into engagement with the rotary shaft and member respectively, one of said washers extending outwardly between the outer end of the corresponding part of the outer ball race and the adjacent end wall of the casing and being formed to serve as a spring biasing said part toward the opposite part to maintain a bearing engagement for said balls.

IRVIN L. ELDER.

REFERENCES CITED

The following references are of record in the file of this patent:

UNITED STATES PATENTS

| Number | Name | Date |
| --- | --- | --- |
| 1,585,140 | Erban | May 18, 1926 |
| 1,713,194 | Ross | May 14, 1929 |
| 1,949,920 | Robertson | Mar. 6, 1934 |
| 1,958,756 | Jahraus | May 15, 1934 |
| 2,051,886 | Neuland | Aug. 25, 1936 |
| 2,152,797 | Erban | Apr. 4, 1939 |

FOREIGN PATENTS

| Number | Country | Date |
| --- | --- | --- |
| 550,234 | Great Britain | Dec. 30, 1942 |